(12) United States Patent
Kim

(10) Patent No.: US 6,253,821 B1
(45) Date of Patent: Jul. 3, 2001

(54) DEVICE FOR ELIMINATING STATIC ELECTRICITY FROM FILM OF LAMINATED SHEETS IN LAMINATORS

(75) Inventor: Yang-Pioung Kim, Seoul (KR)

(73) Assignee: GMP Co., Ltd., Seoul (KR)

( * ) Notice: Subject to any disclaimer, the term of this patent is extended or adjusted under 35 U.S.C. 154(b) by 0 days.

(21) Appl. No.: 09/285,907

(22) Filed: Apr. 2, 1999

(51) Int. Cl.[7] ....................................... B32B 31/00
(52) U.S. Cl. ..................... 156/556; 156/498; 156/555; 361/212
(58) Field of Search ................... 156/498, 540, 156/556, 555, 559; 361/2 R, 214, 220

(56) References Cited

U.S. PATENT DOCUMENTS

| | | | |
|---|---|---|---|
| 3,738,897 | * 6/1973 | Bianchini et al. | 156/498 |
| 5,571,368 | * 11/1996 | Barge | 156/359 |
| 5,649,261 | * 7/1997 | Schlickhoff et al. | 396/571 |

* cited by examiner

Primary Examiner—Richard Crispino
Assistant Examiner—Sue A. Purvis
(74) Attorney, Agent, or Firm—Harrison & Egbert

(57) ABSTRACT

A device for eliminating static electricity from protective film of a laminated sheet in a laminator is disclosed. A longitudinal fan is set in the laminator. An air suction port is formed on the bottom wall of the laminator, thus guiding atmospheric air to the fan. An air passage is formed in the laminator so as to guide the pressurized air current from the fan to the rear wall of the laminator. An air exhaust port is formed on the rear wall of the laminator at a position around the rear end of the air passage, thus discharging the pressurized air into the atmosphere. In the fan, a drive motor is installed at one end of a longitudinal housing, while a plurality of longitudinal blades are regularly arranged in the housing so as to form a cylindrical blade body. An inlet opening is longitudinally formed at the lower portion of the housing and guides the atmospheric air to the blade body, while an air outlet opening is longitudinally formed at the upper portion of the housing so as to discharge the pressurized air current from the fan into the air passage.

2 Claims, 2 Drawing Sheets

DEVICE FOR ELIMINATING STATIC ELECTRICITY FROM FILM OF LAMINATED SHEETS IN LAMINATORS

BACKGROUND OF THE INVENTION

1. Field of the Invention

The present invention relates, in general, to laminators used for covering both sides of an object sheet with two sheets of protective film and, more particularly, to a device for eliminating static electricity from the protective film of laminated sheets using an air current in such a laminator, thus allowing the laminated sheets to be smoothly discharged from the laminator without undesirably sticking to a frame around the sheet outlet of the laminator due to the static electricity.

2. Description of the Prior Art

As well known to those skilled in the art, a laminator, used for covering both sides of an object sheet with protective film, typically comprises two film rolls respectively installed at the upper and lower portions of a main body. An object sheet, which is to be covered with protective film at both sides thereof, is positioned at the sheet inlet of the main body prior to starting the laminator. When the laminator is started, the object sheet moves along a sheet passage extending from the inlet to a sheet outlet in the laminator. In such a case, two sheets of protective film, fed from the two film rolls, respectively pass over upper and lower heating rollers, so that the film is appropriately heated and laminated on both sides of the object sheet moving along the sheet passage. The laminated sheet, covered with the two sheets of film at both sides thereof, is finally discharged from the main body through the sheet outlet.

However, such a typical laminator is problematic in that static electricity is thermally induced on the protective film during the process of heating the film and is maintained on the laminated sheet for a period of time, so that the laminated sheet may fail to be smoothly discharged from the laminator, but may undesirably stick to a frame of the laminator at a position around the sheet outlet due to such static electricity. In addition, the protective film is heated to a high temperature during the heating process, so that the film may crumple easily, in which case the quality of the laminated sheets is reduced.

SUMMARY OF THE INVENTION

Accordingly, the present invention has been made keeping in mind the above problems occurring in the prior art, and an object of the present invention is to provide a device, which eliminates static electricity from the protective film of a laminated sheet using an air current formed by a longitudinal fan in a laminator, thus allowing the laminated sheets to be smoothly discharged from the laminator without undesirably sticking to a frame around the sheet outlet of the laminator due to the static electricity, and which effectively reduces the temperature of the film, thus allowing the film to maintain a desired flatness.

In order to accomplish the above object, the present invention provides a device for eliminating static electricity from protective film of a laminated sheet in a laminator, comprising: a longitudinal fan set in the laminator so as to generate a pressurized air current; an air suction port provided on a bottom wall of the laminator by perforating the bottom wall at a position around the fan, thus guiding atmospheric air to the fan; an air passage provided in the laminator so as to guide the pressurized air current from the fan to a rear wall of the laminator; and an air exhaust port provided on the rear wall of the laminator by perforating the rear wall at a position around a rear end of the air passage, thus discharging the pressurized air current from the laminator into the atmosphere.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
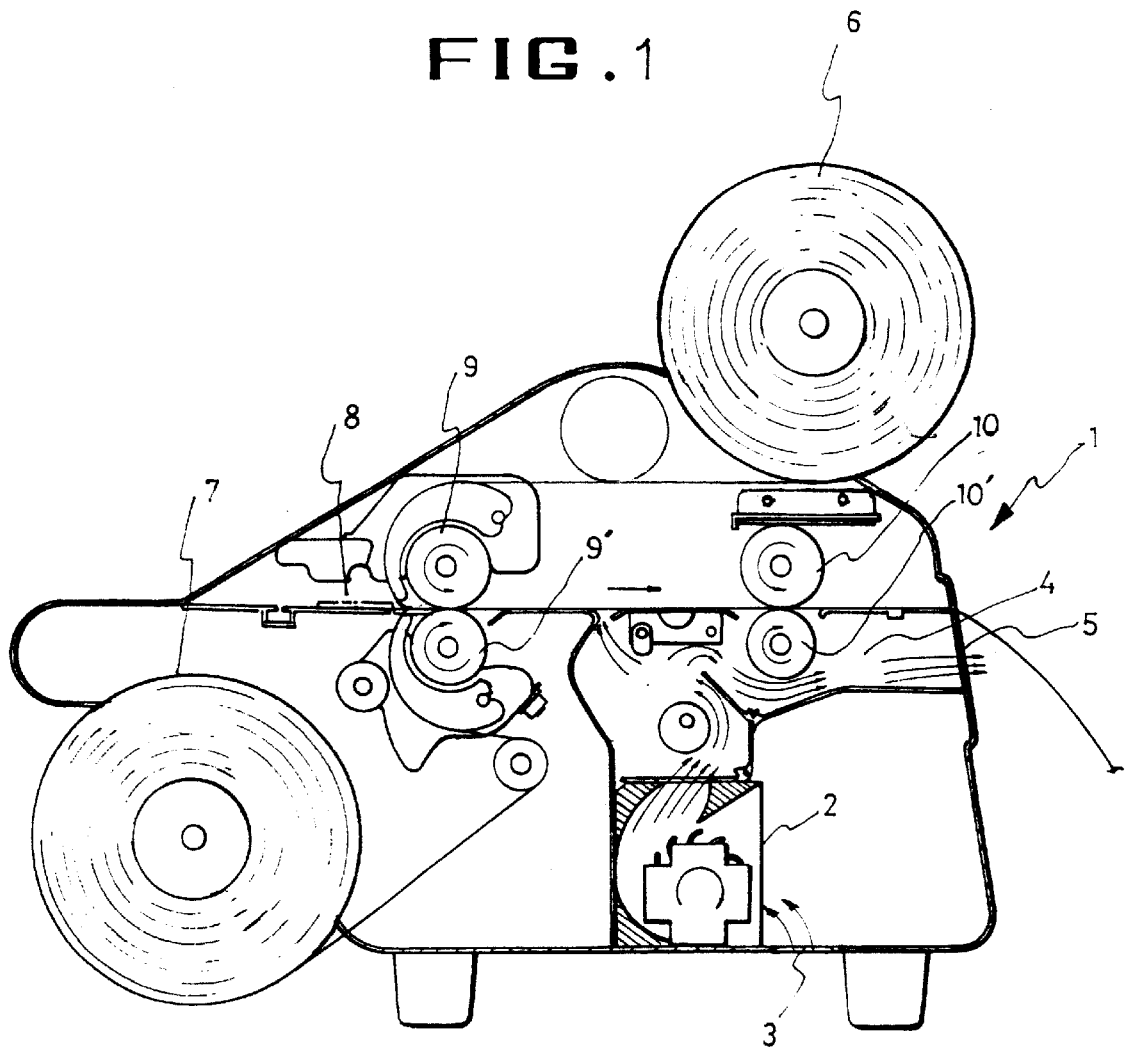
FIG. 1 is a sectional view of a laminator in accordance with the preferred embodiment of the present invention.

As shown in the drawings, the laminator of this invention comprises a main body 1 with a longitudinal fan 2 interiorly set on the bottom wall of the body 1. An air suction port 3 is provided on the bottom wall of the body 1 at a position around the fan 2, thus guiding atmospheric air to the fan 2. The above suction port 3 comprises a plurality of holes formed on the bottom wall of the body 1. An air passage 4 is formed in the body 1 in a way such that the passage 4 extends from the fan 2 to the rear wall of the body 1, thus guiding pressurized air from the fan 2 to the rear wall of the body 1. Provided on the rear wall of the body 1 at a position around the outlet end of the air passage 4 is an air exhaust port 5. The pressurized air from the fan 2 is discharged from the main body 1 into the atmosphere through the exhaust port 5.

Figure 2:
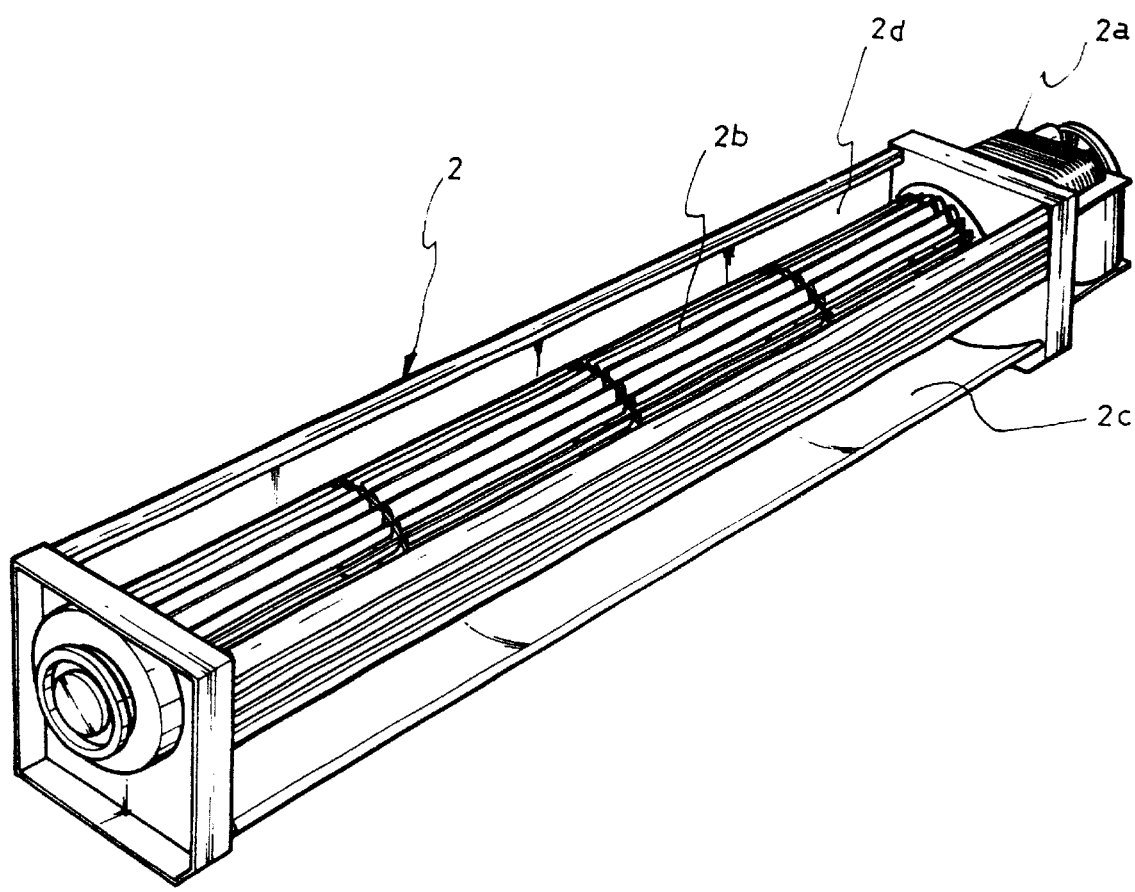
FIG. 2 is a perspective view of a fan set in the laminator of FIG. 1.

As shown in FIG. 2, in the above fan 2, a drive motor 2a is installed at one end of a fan housing. A plurality of longitudinal blades 2b are regularly arranged in the fan housing so as to form a cylindrical blade body. The above blade body is rotatable by the rotating force of the above motor 2a, thus forming a suction force. An air inlet opening 2c is longitudinally formed at the inlet side of the fan housing with the inlet side being positioned at the lower portion of the fan housing. The above inlet opening 2c guides atmospheric air to the blades 2b when the blades 2b are rotated. The atmospheric air is, thereafter, pressurized by the blades 2b prior to being discharged into the air passage 4. In order to discharge the pressurized air from the fan 2 into the air passage 4, an air outlet opening 2d is longitudinally formed at the outlet side of the fan housing with the outlet side being positioned at the upper portion of the fan housing.

In FIG. 1 of the drawings, the reference numerals 6 and 7 denote two film rolls, which are respectively provided at the upper and lower portions of the main body 1 and are used for supplying protective film. The numeral 8 denotes an object sheet to be covered with two sheets of protective film at both sides thereof. The numerals 9 and 9' denote-heating rollers respectively used for heating the film from the two rollers 6 and 7. The numerals 10 and 10' denote distributing rollers used for discharging the laminated sheets 8 from the main body 1 of the laminator.

The operational effect of the above laminator will be described hereinbelow.

The two film rolls 6 and 7 are installed in the upper and lower portions of the main body 1, while a object sheet 8 is laid on a support panel provided in the front of the sheet inlet of the laminator. When the laminator is started, the protective film is fed from the two film rolls 6 and 7 to the heating rollers 9 and 9' at a predetermined speed, while the object sheet 8 moves along the sheet passage in the main body 1 at an appropriate speed suitable for allowing the sheet 8 to precisely meet the film at a predetermined position inside the main body 1. Therefore, both sides of the object sheet 8 are covered with two sheets of protective film, so that the object sheet 8 becomes a laminated sheet. The laminated sheet 8 is, thereafter, guided to the nip between the two distributing rollers 10 and 10', thus being discharged from the laminator.

In such a case, the fan 2 is started in conjunction with the start of the laminator, thus forming pressurized air.

The pressurized air flows through the air passage 4 from the fan 2 to the air exhaust port 5. When the pressurized air passes through the passage 4 as described above, the air prevents the laminated sheet 8 from unexpectedly sticking to the frame of the main body at a position around the sheet outlet due to static electricity. The pressurized air also reduces the temperature of the protective film, thus preventing the film from crumpling. Therefore, the laminator of this invention smoothly discharges the laminated sheets 8 from the main body 1 without allowing the sheets 8 to undesirably stick to the main body due to static electricity. The laminator also reduces the temperature of the protective film to an appropriate point, thus allowing the heated film to maintain a desired flatness. This accomplishes a desired quality of laminated sheets 8.

As described above, the present invention provides a device for eliminating static electricity from the protective film of a laminated sheet using an air current in a laminator. The device forms pressurized air using a fan and makes the air pass through an air passage in the laminator while preventing the laminated sheet from sticking to the frame of the laminator at a position around the sheet outlet due to the static electricity. The air also reduces the temperature of the protective film, thus allowing the heated film to maintain a desired flatness which accomplishes a desired quality of the laminated sheet.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for eliminating static electricity from a laminated sheet comprising:

a laminator having a bottom wall and a rear wall, said laminator having means for moving a laminated sheet therethrough along a direction toward a discharge opening at said rear wall of said laminator;

a longitudinal fan means positioned in said laminator so as to extend transverse to said direction, said longitudinal fan means for generating a pressurized air current;

an air suction port formed on said bottom wall of said laminator, said air suction port allowing air to pass toward said longitudinal fan means;

an air passage formed in said laminator so as to allow the pressurized air from said longitudinal fan means to pass toward said rear wall of said laminator adjacent said discharge opening; and an air exhaust port formed in said rear wall of said laminator at an end of said air passage so as to allow the pressurized air to exit the laminator, said air exhaust port positioned below said discharge opening.

2. The apparatus of claim 1, said longitudinal fan means comprising:

a longitudinal housing;

a drive motor positioned at one end of said longitudinal housing;

a cylindrical blade body having a plurality of longitudinal blades regularly arranged and extending thereover, said cylindrical blade body positioned in said housing, said drive motor drivingly connected to said cylindrical blade body;

an air inlet opening extending longitudinally along a lower portion of said housing, said air inlet opening communicating with said air suction port; and an air outlet opening extending longitudinally along an upper portion of said housing, said air outlet opening communicating with said air passage.

\* \* \* \* \*